US009363848B2

(12) United States Patent
Tajima et al.

(10) Patent No.: US 9,363,848 B2
(45) Date of Patent: Jun. 7, 2016

(54) COMMUNICATION CONTROL DEVICE, MOBILE STATION, AND COMMUNICATION CONTROL METHOD

(71) Applicant: FUJITSU LIMITED, Kawasaki-shi, Kanagawa (JP)

(72) Inventors: Yoshiharu Tajima, Yokohama (JP); Kazuaki Ando, Shibuya (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/271,026

(22) Filed: May 6, 2014

(65) Prior Publication Data
US 2015/0004929 A1     Jan. 1, 2015

(30) Foreign Application Priority Data

Jul. 1, 2013   (JP) .................................. 2013-138268

(51) Int. Cl.
H04W 88/02 (2009.01)
H04W 24/08 (2009.01)
H04W 4/00 (2009.01)
H04L 12/26 (2006.01)
(Continued)

(52) U.S. Cl.
CPC .......... *H04W 88/02* (2013.01); *H04L 43/0876* (2013.01); *H04W 4/003* (2013.01); *H04W 24/08* (2013.01); *H04W 72/08* (2013.01); *H04W 72/10* (2013.01)

(58) Field of Classification Search
None
See application file for complete search history.

(56) References Cited

U.S. PATENT DOCUMENTS

2002/0093976 A1* 7/2002 Razoumov ............ H04L 1/0002
370/444
2006/0013128 A1* 1/2006 Connor ............... H04L 41/0896
370/229
(Continued)

FOREIGN PATENT DOCUMENTS

JP   2002-262262    9/2002
JP   2004-297479   10/2004
JP   2010-213338    9/2010

OTHER PUBLICATIONS

USPTO, [SIVJI] Non-Final Rejection, Oct. 15, 2015, in co-pending U.S. Appl. No. 14/285,113 [pending].
(Continued)

Primary Examiner — Olumide T Ajibade Akonai
Assistant Examiner — Margaret G Mastrodonato
(74) Attorney, Agent, or Firm — Fujitsu Patent Center

(57) ABSTRACT

A communication control device includes a traffic monitoring unit, the number of ranks calculation unit, a rank value calculation unit, a communication control unit, and a download unit. The traffic monitoring unit monitors a traffic amount between a content server and a base station. The number of ranks calculation unit calculates the number of rank values that servers as a reference for determining a download destination mobile station of data based on a monitoring result by the traffic monitoring unit. The rank value calculation unit calculates the rank value for each mobile station using the number and radio communication quality of a plurality of mobile stations. The communication control unit determines the download destination mobile station in order from a mobile station having a high rank value at a determination timing. The download unit downloads the data to the mobile station determined as the download destination.

4 Claims, 7 Drawing Sheets

(51) Int. Cl.
*H04W 72/08* (2009.01)
*H04W 72/10* (2009.01)

(56) References Cited

U.S. PATENT DOCUMENTS

2006/0153216 A1* 7/2006 Hosein .................. H04L 1/0002
 370/412

2013/0339530 A1 12/2013 Nishioka

OTHER PUBLICATIONS

USPTO, [SIVJI] Notice of Allowance, Feb. 3, 2016, in co-pending U.S. Appl. No. 14/285,113 [allowed].

* cited by examiner

COMMUNICATION CONTROL DEVICE, MOBILE STATION, AND COMMUNICATION CONTROL METHOD

CROSS-REFERENCE TO RELATED APPLICATION

This application is based upon and claims the benefit of priority of the prior Japanese Patent Application No. 2013-138268, filed on Jul. 1, 2013, the entire contents of which are incorporated herein by reference.

FIELD

The embodiment discussed herein is related to a communication control device, a mobile station, and a communication control method.

BACKGROUND

In recent years, with the development of radio communication technologies, radio communication technologies using a new system like the long term evolution (LTE) or the LTE Advanced are becoming widespread, in addition to related radio communication systems such as the wideband-code division multiple access (W-CDMA). In the field of radio communication, various technologies to efficiently use limited radio resources between mobile stations and base stations have been developed. One of such various technologies, there is a technology in which a control device acquires radio communication quality of each mobile station in each predetermined area, and controls the radio communication between a base station and a mobile station such that the mobile station performs communication only in an area in which the mobile station has favorable quality. Accordingly, the operator side of the radio communication can effectively use a radio resource, and also the user can obtain an effect to suppress the power consumption of the mobile station.

Patent Document 1: Japanese Laid-open Patent Publication No. 2010-213338

Patent Document 2: Japanese Laid-open Patent Publication No. 2004-297479

The above-described control device divides a service area of the base station to set up a plurality of grid-like areas, and collects information indicating the radio communication quality such as a signal to interference ratio (SIR), and the like, for each grid in advance. Then, when the mobile station requests download of data and the like, the control device compares the radio communication quality measured by the mobile station, and the radio communication quality of the grid where the mobile station is positioned, and determines whether executing the download to the mobile station based on a comparison result. However, such determination processing is performed based on the communication quality of the mobile station side, and thus download control suitable for a traffic state of the network side is not always necessarily executed. Therefore, when the number of mobile stations connected to the base station is large, a radio source amount that can be allocated to one mobile station is small, and thus the time used for download for each mobile station becomes longer by the download control. This becomes a cause to hinder the efficient use of the radio resources.

SUMMARY

According to an aspect of the embodiments, a communication control device includes: a monitoring unit that monitors a traffic amount between a server that downloads data to a plurality of mobile stations and a base station; a number calculation unit that calculates the number of steps of a value that serves as a reference for determining a mobile station of a download destination of the data based on a monitoring result by the monitoring unit; a value calculation unit that calculates the value for each mobile station using the number of steps calculated by the number calculation unit and radio communication quality of the plurality of mobile stations; a determination unit that determines the mobile station of a download destination in order from a mobile station in which the value at a first timing is higher, the value being calculated by the value calculation unit; and a control unit that downloads the data to the mobile station determined as the download destination by the determination unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that the communication control device, the mobile station, and the communication control method disclosed in the present application are not limited by the following embodiments.

Figure 1:
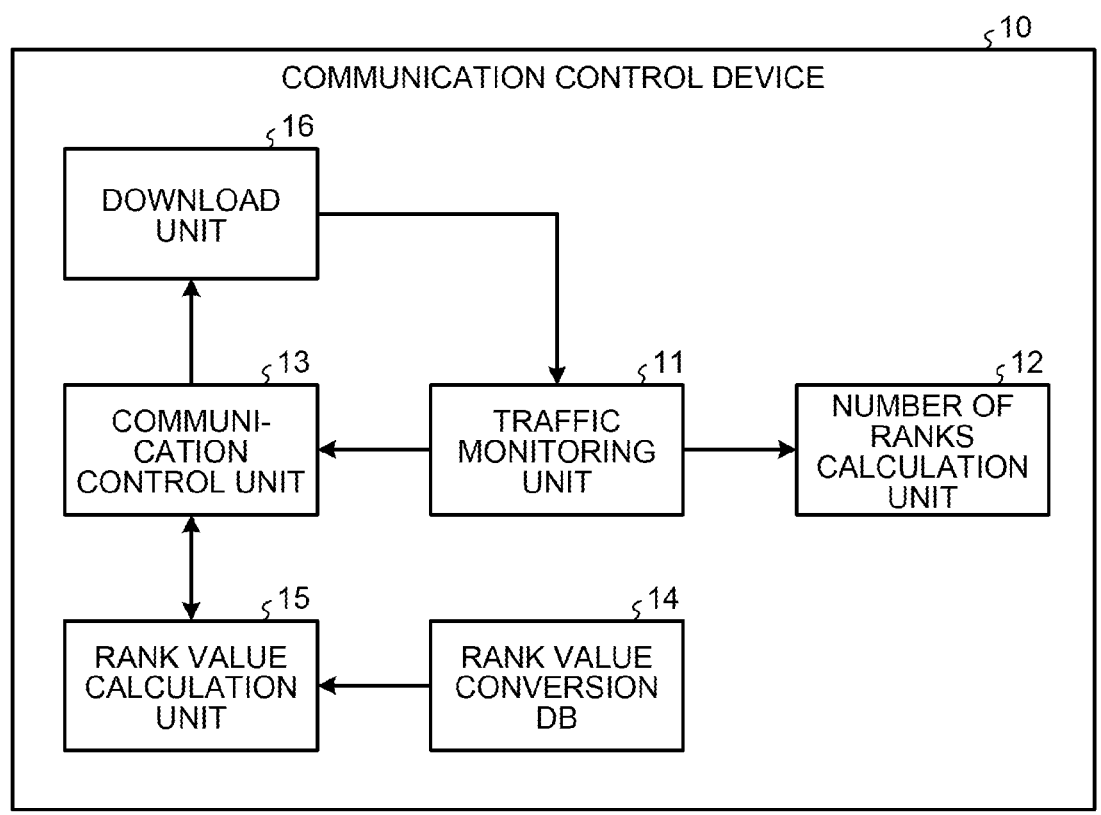
FIG. 1 is a block diagram illustrating a functional configuration of a communication control device.

Hereinafter, a configuration of a communication control device according to an embodiment disclosed in the present application will be described. FIG. 1 is a block diagram illustrating a functional configuration of a communication control device 10. As illustrated in FIG. 1, the communication control device 10 includes a traffic monitoring unit 11, a number of ranks calculation unit 12, a communication control unit 13, a rank value conversion DB 14, a rank value calculation unit 15, and a download unit 16. These configuration units are connected to be capable of unidirectionally or bidirectionally inputting/outputting data and signals.

The traffic monitoring unit 11 ordinarily monitors the traffic amount between a content server 30 that is a download source of data and a base station 40. When the traffic amount becomes a predetermined value or more, the traffic monitoring unit 11 instructs calculation of the number of ranks to the number of ranks calculation unit 12. The number of ranks calculation unit 12 calculates the number of ranks according to a rate of the traffic to be decreased and a threshold value based on a predetermined calculation formula described below. The communication control unit 13 receives radio communication quality information transmitted from a mobile station 20, and outputs the information to the rank value calculation unit 15. The communication control unit 13 compares rank values of mobile stations at a timing when determining a mobile station that is to be an allocation destination of a download resource (hereinafter, the timing is described as "determination timing"). As a result of the comparison, the communication control unit 13 selects a predetermined number of mobile stations from among mobile stations having higher rank values as stations to receive download (download-ON stations).

The rank value conversion DB 14 stores information for identifying a rank to which the radio communication quality belongs for each mobile station. The rank value calculation unit 15 converts the radio communication quality information into a rank value with reference to the information stored in the rank value conversion DB 14, and outputs the rank value to the communication control unit 13. The download unit 16 executes download of data with respect to the mobile stations selected as the stations to receive download according to ON/OFF information of download input from the communication control unit 13.

Figure 2:
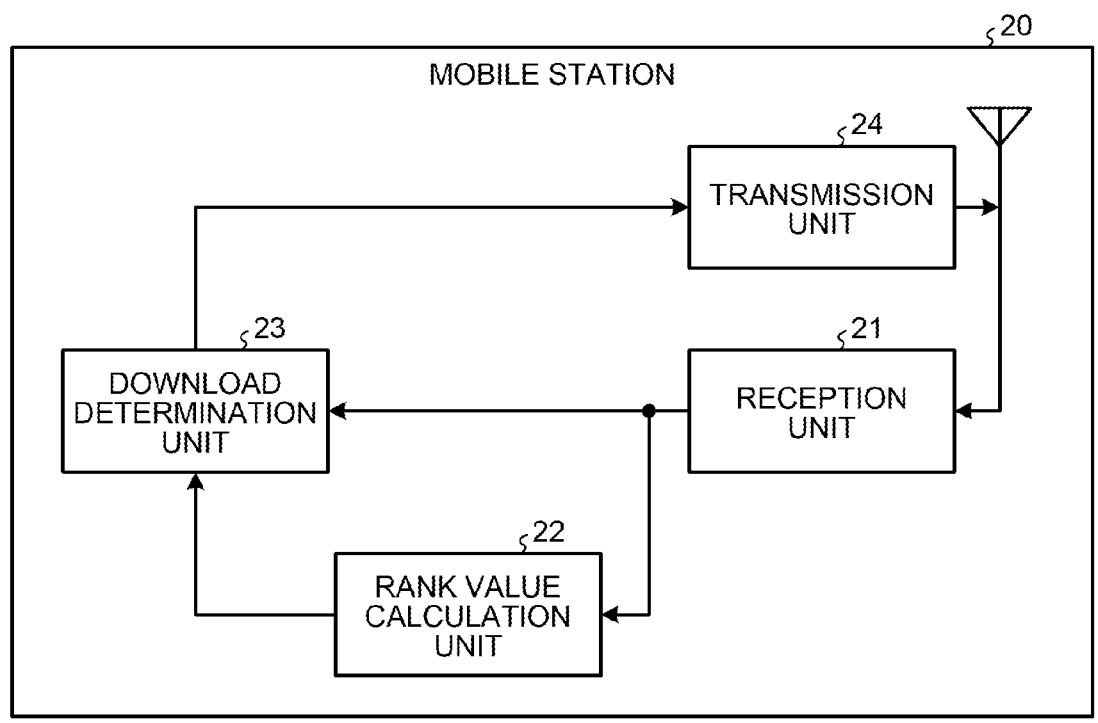
FIG. 2 is a block diagram illustrating a functional configuration of a mobile station.

The above-described calculation of the rank value may be performed by the mobile station 20. FIG. 2 is a block diagram illustrating a functional configuration of the mobile station 20. As illustrated in FIG. 2, the mobile station 20 includes a reception unit 21, a rank value calculation unit 22, a download determination unit 23, and a transmission unit 24. These configuration units are connected to be capable of unidirectionally or bidirectionally inputting/outputting data and signals.

The reception unit 21 measures the radio communication quality such as the SIR in the mobile station 20. The rank value calculation unit 22 sets a threshold value based on the radio communication quality (the maximum value and the minimum value in the past) measured by the reception unit 21 and the number of ranks notified from the communication control device 10, and calculates a rank value to which the radio communication quality belongs at the determination timing. The download determination unit 23 determines ON or OFF of download based on the rank value when having been notified the rank value of the mobile station that is to be the station to receive download (download-ON station) from the communication control device 10 in advance. The transmission unit 24 notifies the communication control device 10 of a determination result by the download determination unit 23.

Note that, when the communication control device 10 performs the calculation of the rank value instead of the mobile station 20, the mobile station 20 notifies the communication control device 10 of the radio communication quality measured by the reception unit 21 without performing the calculation of the rank value and the ON/OFF determination of download.

Figure 3:
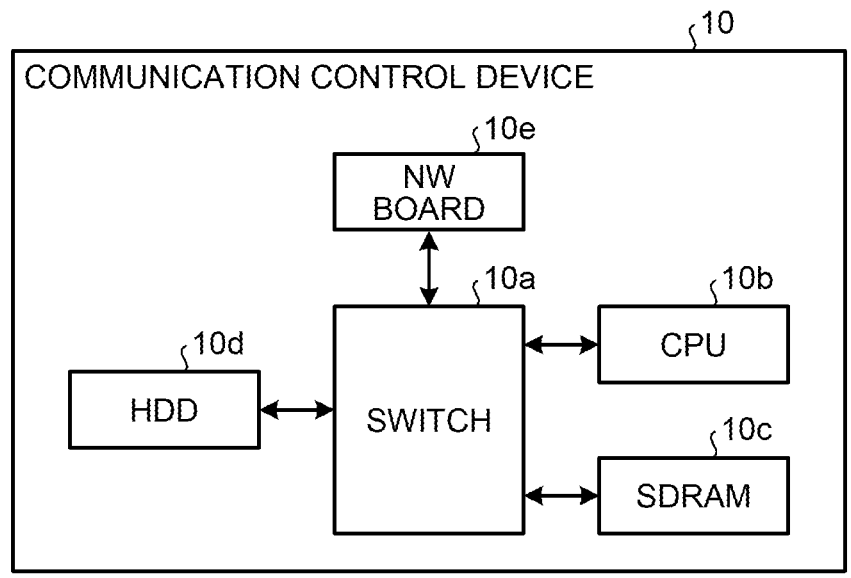
FIG. 3 is a block diagram illustrating a hardware configuration of the communication control device.

Next, hardware configurations of the communication control device 10 and the mobile station 20 will be described. FIG. 3 is a block diagram illustrating a hardware configuration of the communication control device 10. As illustrated in FIG. 3, in the communication control device 10, a central processing unit (CPU) 10b, a synchronous dynamic random access memory (SDRAM) 10c, a hard disk drive (HDD) 10d, and a network (NW) board 10e are connected to be capable of inputting/outputting various signals and data through a switch 10a. Regarding correspondence between the functional configuration and the hardware configuration of the communication control device 10, the rank value conversion DB 14 of the communication control device 10 is realized by the HDD 10d, for example. Further, the traffic monitoring unit 11, the number of ranks calculation unit 12, the communication control unit 13, and the rank value calculation unit 15 are realized by the CPU 10b, for example. Further, the download unit 16 is realized by the CPU 10b and the NW board 10e, for example.

Figure 4:
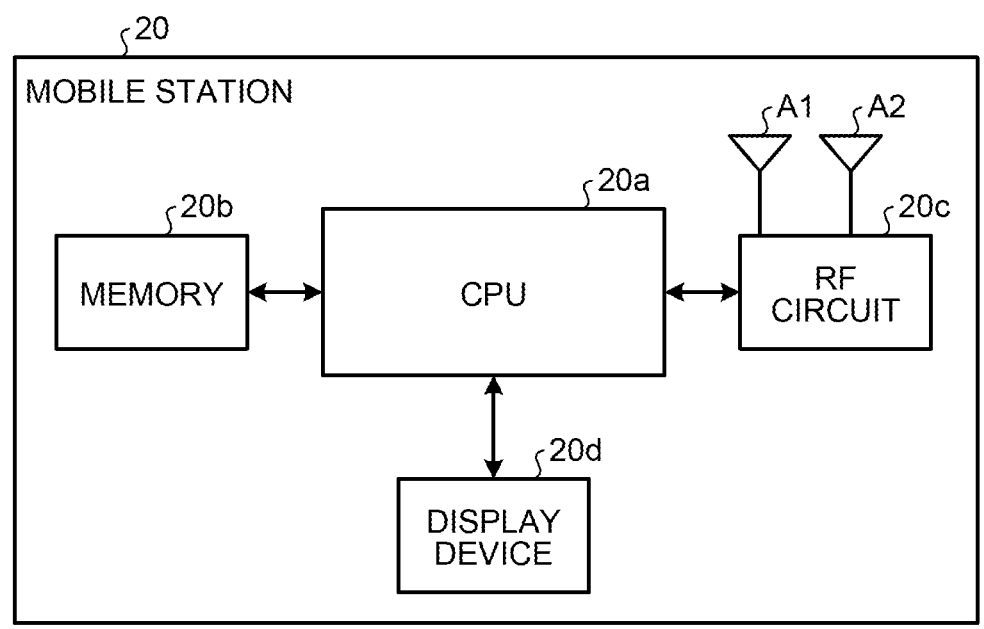
FIG. 4 is a block diagram illustrating a hardware configuration of the mobile station.

The mobile station 20 is realized by a mobile terminal such as a smart phone. FIG. 4 is a block diagram illustrating a hardware configuration of the mobile station 20. As illustrated in FIG. 4, the mobile station 20 includes a CPU 20a, a memory 20b, a radio frequency (RF) circuit 20c, and a display device 20d in the hardware sense. The RF circuit 20c includes antennas A1 and A2. The memory 20b is a RAM such as an SDRAM, a ROM, or a flash memory. The display device 20d is a liquid crystal display (LCD) or an electro luminescence (EL). In relation to correspondence between the functional configuration and the hardware configuration, the rank value calculation unit 22 and the download determination unit 23 among the functional configuration elements illustrated in FIG. 2 are realized by an integrated circuit such as the CPU 20a, for example. The reception unit 21 and the transmission unit 24 are realized by the RF circuit 20c.

Next, an operation will be described.

Figure 5:
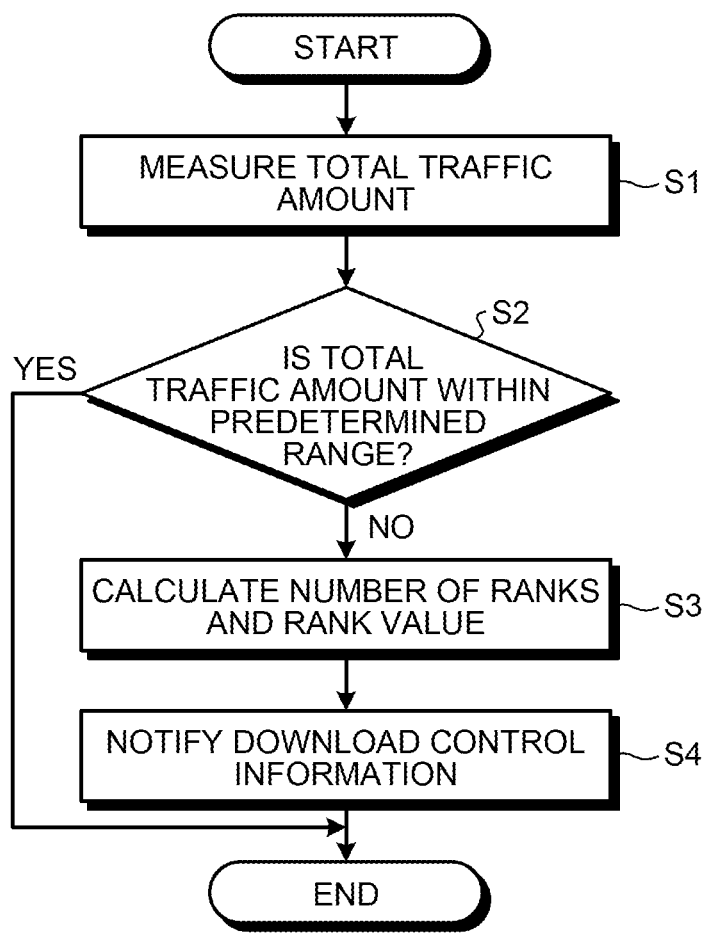
FIG. 5 is a flowchart for describing an operation of the communication control device.

First, an operation of the communication control device 10 in the present embodiment will be described. FIG. 5 is a flowchart for describing an operation of the communication control device 10. In S1, the traffic monitoring unit 11 of the communication control device 10 measures a total traffic amount associated with the download to the mobile stations including the mobile station 20. As a result of the measurement, when the total traffic amount falls within a range of a predetermined amount (for example, 100 MB) that is allowed by the network side (Yes in S2), the traffic monitoring unit 11 determines that the download to all of the accommodated mobile stations is possible, and terminates the processing.

As a result of the measurement, when the total traffic amount measured in S1 exceeds the range of a predetermined amount allowed by the network side (No in S2), the number of ranks calculation unit 12 of the communication control device 10 calculates the number of ranks based on a predetermined calculation formula described below (S3). Note that, when the mobile station 20 performs ON/OFF determination of download, the communication control device 10 also calculates a lower limit rank value that turns the download ON, in addition to the number of ranks.

In S4, the download unit 16 of the communication control device 10 notifies the mobile station 20 of the number of ranks and the rank value calculated in S3 as download control information. Accordingly, the mobile station 20 can accurately determine whether the rank value calculated by the own station is a download executable value even if the own station performs the ON/OFF determination of download.

Figure 6:
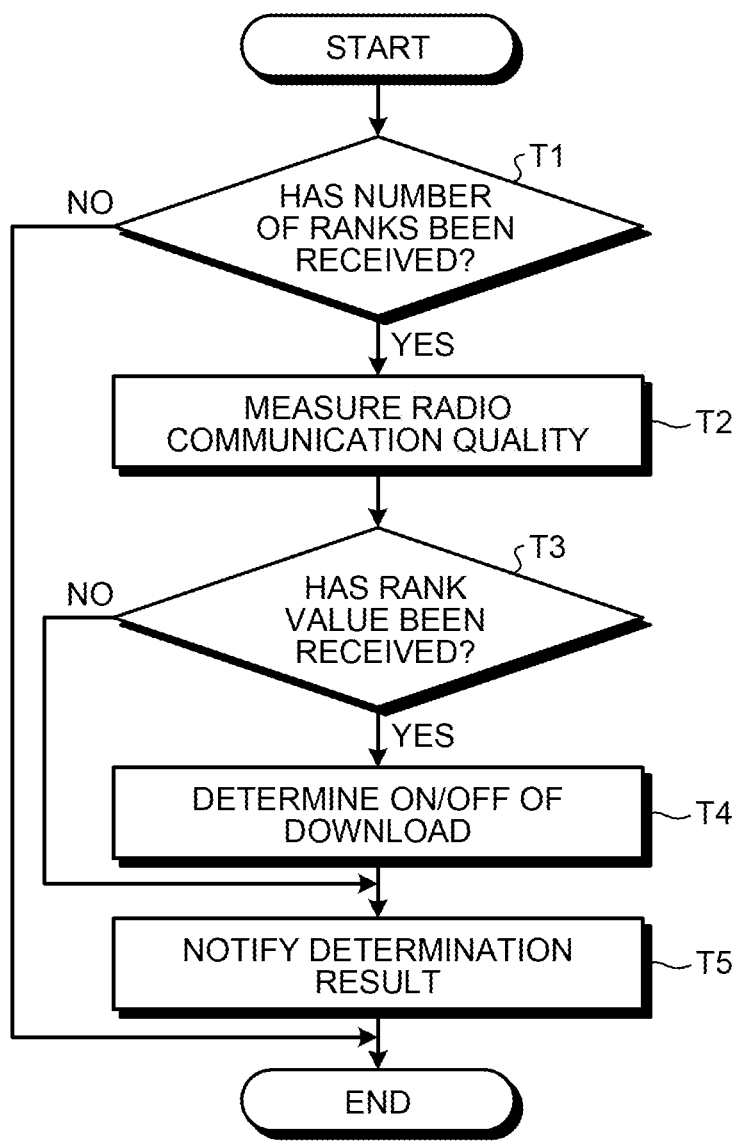
FIG. 6 is a flowchart for describing an operation of the mobile station.

Next, an operation of the mobile station 20 in the present embodiment will be described. FIG. 6 is a flowchart for describing an operation of the mobile station 20. In T1, the reception unit 21 of the mobile station 20 waits for reception of the number of ranks transmitted from the communication control device 10. When having detected reception of the number of ranks, the reception unit 21 measures the radio communication quality between the mobile station 20 and the base station 40 (T2). In T3, the reception unit 21 of the mobile station 20 monitors the reception of the rank value transmitted from the communication control device 10. As a result of the monitoring, when the reception of the rank value has been detected (Yes in T3), the download determination unit 23 of the mobile station 20 determines ON or OFF of download based on the number of ranks received in T1 and the rank value received in T3 (T4). In T5, the transmission unit 24 of the mobile station 20 notifies the communication control device 10 of a determination result of the download determination unit 23.

Note that, as a result of the determination in T3, when the reception of the rank value is not detected during a predetermined time (No in T3), the above processing of T4 is omitted. That is, the transmission unit 24 of the mobile station 20 notifies the communication control device 10 of only a measurement result of the radio communication quality (for example, the SIR) in T2.

Figure 7:
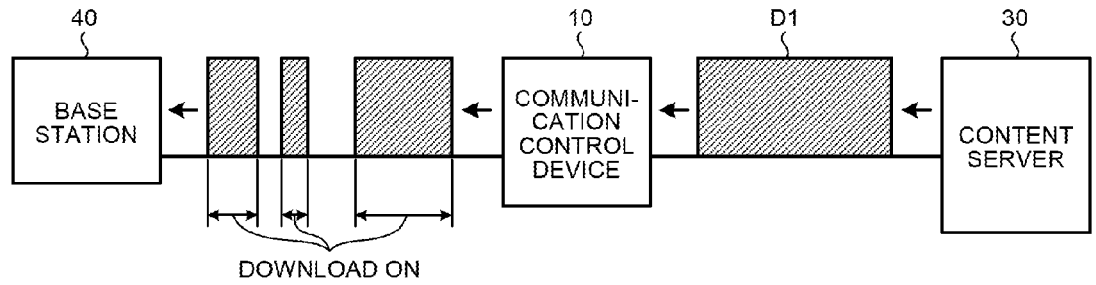
FIG. 7 is a diagram for describing an outline of download control between a content server and a base station.

Next, the download control executed by the communication control device 10 will be described in detail with reference to FIGS. 7 to 9. FIG. 7 is a diagram for describing an outline of the download control between the content server 30 and the base station 40. As illustrated in FIG. 7, the communication control device 10 relays content data D1 that is an object to be downloaded distributed from the content server 30, and transmits the content data D1 to the base station 40. Prior to the transmission, the communication control device 10 determines ON or OFF of download for each mobile station based on the calculated rank value of each mobile station. The communication control device 10 transfers the content data D1 only to the download-ON mobile station (for example, the mobile station 20).

In other words, not only performing determination according to the download-ON and download-OFF stations, but also the communication control device 10 sets intermediate states between the ON and OFF in stages and expresses the states by rank values, thereby to preferentially allocate a download resource to a mobile station having a higher rank value. Accordingly, narrowing down of the download destination mobile station of the content data D1 is realized. Therefore, compared with a related method of conducting download to all of the mobiles stations who have made a request, efficient distribution of the download resources becomes possible. As a result, the use efficiency of the radio resources is improved.

Figure 8:
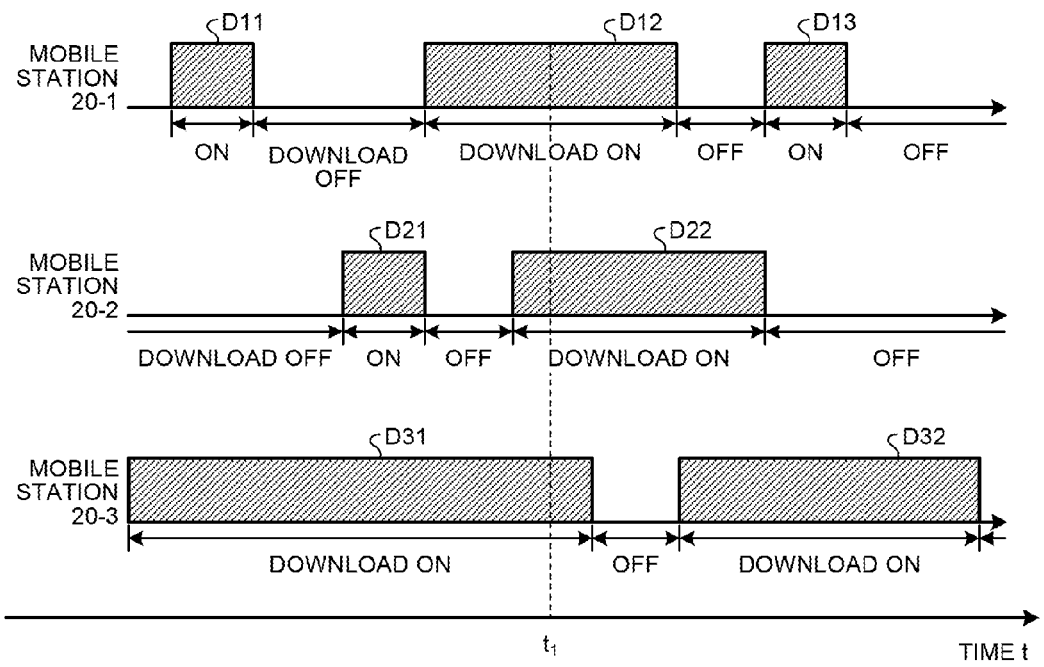
FIG. 8 is a diagram for describing related download control.
Figure 9:
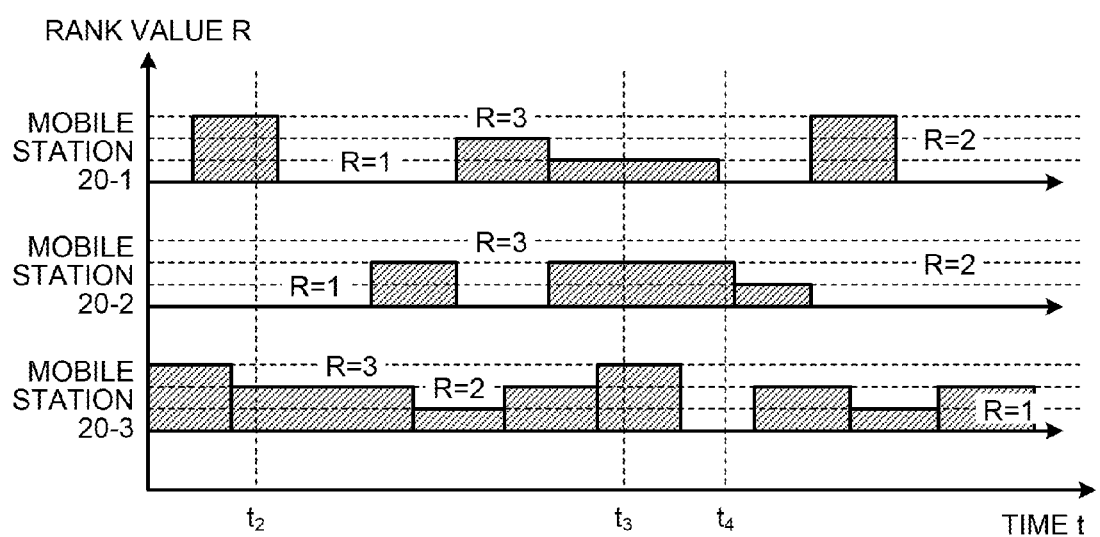
FIG. 9 is a diagram for describing the download control in the present embodiment.

FIG. 8 is a diagram for describing related download control. As illustrated in FIG. 8, in the related download control, the download-ON state may be overlapped in all of the mobile stations 20-1 to 20-3, as illustrated in a time $t_1$. In this case, a sufficient resource may not be able to be allocated to all of the mobile stations 20-1 to 20-3 depending on the radio resource amount that can be allocated by the network side.

That is, in the related download control, the mobile stations 20-1 to 20-3 individually perform ON/OFF control based on the radio communication quality measured by the own station. Therefore, download control suitable for the state of the radio communication system, such as the traffic state of the network side, is not always necessarily performed. Therefore, for example, when the number of mobile stations accommodated in the base station 40 is large, the resource to be allocated to each mobile station (the radio resource amount per unit mobile station) is small, and thus the time to finish the download in each mobile station becomes very long depending on the application of the related download control. As a result, there is a concern that the use efficiency of the radio resources is rather decreased by the execution of the download control.

Therefore, the communication control device 10 according to the present embodiment performs download control in consideration of the traffic state of the network side. FIG. 9 is a diagram for describing the download control in the present embodiment. In FIG. 9, a time t is defined in an x axis direction, and a rank value R is defined in a y axis direction. For example, as illustrated in FIG. 9, when the determination timing is a time $t_2$, the rank value R of the mobile station 20-1 is "3", and is larger than the rank value R=2 of the mobile station 20-3. Further, the rank value R of the mobile station 20-2 is "0". Therefore, the download becomes ON in the order of priority of the mobile stations 20-1, 20-3, and 20-2.

Similarly, when the determination timing is a time $t_3$, the rank value R is higher in the order of the mobile stations 20-3, 20-2, and 20-1, and thus the download destination is determined in the order of priority of the mobile stations 20-3, 20-2, and 20-1. Meanwhile, when the determination timing is a time $t_4$, the rank value of the mobile station 20-2 is "2", and the rank values of other mobile stations 20-1 and 20-3 are "0". Thus, the mobile station 20-2 is preferentially determined as the download destination.

Hereinafter, a process in which ON or OFF of download is determined for each mobile station will be described in more detail.

First, a method of determining the number of ranks will be described. The number of ranks NR is determined, for example, by the following calculation formula (1):

$$NR=1/RT \tag{1}$$

Here, the ratio of traffic (RT) is a ratio of traffic to be restricted (a decrease rate) among the traffic flowing into the base station 40. The RT is determined using the total traffic amount, or the number of mobile stations accommodated in the base station 40 as a parameter. The RT is ⅕ to ½, for example. The RT takes a large value because necessity of decreasing the traffic amount becomes higher as the total traffic amount or the number of the mobile stations is larger. This enables the communication control device 10 to narrow down the mobile stations to be the stations to receive download (download-ON stations) into a predetermined number of mobile stations having higher rank values from among the mobile stations accommodated in the base station 40.

For example, when the communication control device 10 wants to decrease the amount of traffic flowing into the base station 40 from the current traffic amount by 30% (see FIG. 7), the number of ranks NR is determined to be "3" according to 1/0.3=3.333 . . . . As a result, the mobile stations connected to the base station 40 are classified into three stages. Further, when the communication control device 10 wants to decrease the traffic amount flowing into the base station 40 to 80% of the present time, the number of ranks NR is determined to be "5" according to 1/0.2=5. As a result, the mobile stations connected to the base station 40 are classified into five stages.

Next, a method of setting the threshold value will be described. The number of threshold values to be set is the number of ranks NR−1. Hereinafter, a case of setting two SIR threshold values $TH_1$ and $TH_2$ when the number of ranks NR=3 will be exemplarily described. The SIR threshold values $TH_1$ and $TH_2$ are respectively determined by the following calculation formulas (2) and (3).

$$TH_1=SIR_{MIN}+(SIR_{MAX}-SIR_{MIN})/3 \tag{2}$$

$$TH_2=SIR_{MIN}+2\times(SIR_{MAX}-SIR_{MIN})/3 \tag{3}$$

Here, the $SIR_{MIN}$ is the minimum value of the SIR of a corresponding mobile station in a past predetermined time (for example, about 10 minutes to 1 hour), and the $SIR_{MAX}$ is the maximum value of the SIR of a corresponding mobile station in a past predetermined time (for example, 10 minutes to 1 hour).

Next, a method of determining the rank value R will be described. The rank value R is determined according to which range of SIR ranges obtained by the SIR threshold values $TH_1$ and $TH_2$ the SIR of the mobile station belongs to. For example, in a case of the number of ranks NR=3, the rank value R is determined to be "1" when the SIR value of the mobile station 20 at the determination timing is less than $TH_1$. Further, when the SIR value is $TH_1$ to $TH_2$ ($TH_2$ is exclusive), the rank value R is determined to be "2". Further, when the SIR value is $TH_2$ or more, the rank value R is determined to be "3".

Next, a method of determining the ON/OFF of download will be described. Whether download in each mobile station is either ON or OFF is determined based on the rank value R. At this time, a mobile station having a larger rank value R, in other words, a mobile station ranked in a higher rank is preferentially selected as the mobile station to receive download (ON). Which mobile stations having which rank value or more among the rank values R=1 to 3 are to be the download-ON stations is determined according to the RT.

For example, when the decrease of the traffic determined by the RT (for example, 30%) can be satisfied even if the communication control device 10 determines mobile stations having the rank value R=2 or more to be the download-ON stations, the communication control device 10 causes the mobile stations having the rank value R=2 or more to be the download-ON stations. This enables the communication control device 10 to suppress the traffic amount flowing into the base station 40 to at least a desired value (a target value of the RT). In contrast, when the decrease of the traffic determined by the RT (for example, 30%) is not satisfied if the communication control device 10 determines the mobile station having the rank value R=2 or more to be the download-ON stations, the communication control device 10 causes only mobile stations having the rank value R=3 to be the download-ON stations. With such control, the communication control device 10 adjusts the traffic amount flowing into the base station 40 to be a desired value or less.

As described above, the communication control device 10 according to the present embodiment includes the traffic monitoring unit 11, the number of ranks calculation unit 12, the rank value calculation unit 15, the communication control unit 13, and the download unit 16. The traffic monitoring unit 11 monitors the traffic amount between the content server 30 that downloads data to a plurality of mobile stations and the base station 40. The number of ranks calculation unit 12 calculates the number of stages (the number of ranks NR) of the rank value R that serves as the reference for determining a download destination mobile station of the data based on the monitoring result of the traffic monitoring unit 11. The rank value calculation unit 15 calculates the rank value R for each mobile station using the number of ranks NR calculated by the number of ranks calculation unit 12 and the radio communication quality of the plurality of mobile stations. The communication control unit 13 determines a download destination mobile station in order from a mobile station having a higher rank value R in the determination timing $t_2$, calculated by the rank value calculation unit 15. The download unit 16 downloads the data to the mobile station determined by the communication control unit 13 as the download destination.

Further, in the communication control device 10, the communication control unit 13 may determine a mobile station having the rank value R at the determination timing $t_2$ being a predetermined value (for example, 2) or more as the download destination mobile station.

Further, in the communication control device 10, the number of ranks calculation unit 12 may calculate the threshold values $TH_1$ and $TH_2$ that are boundary values of a plurality of rank values R, for each mobile station, using the maximum value $SIR_{MAX}$ and the minimum value $SIR_{MIN}$ of the mobile communication quality of the plurality of mobile stations in a predetermined time and the number of ranks NR. Further, the rank value calculation unit 15 may calculate the rank value R, for each mobile station, based on whether the radio communication quality of each mobile station is equal to or more than the threshold values $TH_1$ and $TH_2$ calculated by the number of ranks calculation unit 12.

The subject of action of the rank value calculation may be the mobile station 20. In such an embodiment, the mobile station 20 includes the rank value calculation unit 22, the download determination unit 23, and the reception unit 21. The rank value calculation unit 22 calculates the rank value R using the number of stages (the number of ranks NR) of the rank value R to serve as a reference for determining the download destination mobile station of the data, the number of stages being calculated based on the monitoring result of the traffic amount between the content server 30 that downloads the data to a plurality of mobile stations and the base station 40, and the radio communication quality of the mobile station 20. The download determination unit 23 determines appropriateness of the download based on whether the rank value R at the determination timing $t_2$ calculated by the rank value calculation unit 22 is equal to or more than a predetermined value (for example, 2) notified from the communication control device 10. When the download has been determined to be executable by the download determination unit 23, the reception unit 21 receives the data to be downloaded from the communication control device 10.

As described above, the communication control device 10 establishes intermediate states between the ON and OFF in addition to the ON and OFF of download, and preferentially allocates the download resource to a mobile station having a higher rank value at a timing of determining to which mobile station the download is executed (determination timing). When setting the intermediate states, the communication control device 10 determines which rank, among a plurality of ranks divided by threshold values, the radio communication quality at the determination timing belongs to. The communication control device 10 executes the download only to a mobile station having a rank value to receive download (for example, R=2 or more) among the mobile stations accommodated in the base station 40. This enables the communication control device 10 to execute suitable download control from a viewpoint of improvement of the use efficiency of the radio resources.

Note that, in the embodiment, the threshold values $TH_2$ and $TH_2$ are determined using the maximum and minimum values of the radio communication quality of each mobile station and the number of ranks. However, the determination of the threshold values is not limited to the embodiment, and the communication control device 10 may determine the threshold values from another point of view from the number of ranks. For example, the communication control device 10 may use a lower threshold value for a mobile station that exists in a farther position from the base station 40, or the like. Alternatively, the communication control device 10 may set the threshold values $TH_1$ and $TH_2$ and determine the rank value R using the threshold values, using not only the distance from the base station 40 but also another parameter such as a moving speed of a mobile station, the degree of interference with another mobile station, existence of an obstacle, or quality of service (QoS), as an index.

Further, in the above embodiment, the communication control device 10 sets the threshold values such that the "$SIR_{MAX}-TH_2$", "$TH_2-TH_1$", and "$TH_1-SIR_{MIN}$" become equal (the same width) in setting the threshold values of $TH_1$ and $TH_2$. However, the "$SIR_{MAX}-TH_2$", "$TH_2-TH_1$", and "$TH_1-SIR_{MIN}$" may be different values. For example, the number of ranks calculation unit 12 of the communication control device 10 can increase the number of mobile stations that belong to the rank value "3" by setting a larger value to $SIR_{MAX}-TH_2$ than the values of $TH_2-TH_1$ and $TH_1-SIR_{MIN}$. Accordingly, more mobile stations can be easily selected as the station to receive download when there are enough resources. In contrast, the number of ranks calculation unit 12 of the communication control device 10 can increase the number of mobiles stations that belong to the rank value "1" by setting a larger value to $TH_1-SIR_{MIN}$ than the values of $SIR_{MAX}-TH_2$ and $TH_2-TH_1$. Accordingly, when the resources are excessively insufficient, the communication control device 10 can perform adjustment to exclude more mobile stations from the station to receive download.

Further, the setting of the unequal threshold values does not need to be similarly performed to all of the mobile stations. That is, the communication control device 10 may individually select a mobile station to which the unequal value is set based on various parameters such as a distance from the base station 40, a moving speed, QoS, and the like. This enables more flexible download control according to the state or the peripheral environment of each mobile station.

Further, in the above embodiment, the communication control device 10 uses the calculation formula of NR=1/RT in determining the number of ranks. However, the communication control device 10 can control the RT in multi-stages using NR=n/RT (n is an integer of 2 or more) other than the above calculation formula. This enables fine adjustment of the ratio of the traffic flowing into the base station 40. As a result, highly efficient allocation of the radio resources with less deficiency and excess can be realized.

Further, in the above embodiment, the description has been given assuming a smart phone as the mobile station 20. However, the present invention can be applied not only to a smart phone but also to various communication devices capable of measuring the radio communication quality, such as a mobile phone and a personal digital assistant (PDA). Further, the radio communication quality is not only the SIR value but also a received signal strength indication (RSSI) value that indicates radio wave intensity, a signal to interference and noise ratio (SINR) value, a reference signal received power (RSRP) value, or reference signal received quality (RSRQ) value. Alternatively, the radio communication quality may be channel state information (CSI) such as channel quality indicator (CQI), precoding matrix indicator (PMI), rank indicator (RI), or layer indicator (LI).

Further, the communication control device 10 may not necessarily be an independent device as illustrated in FIG. 7, and may be incorporated in the content server 30 or the base station 40.

Further, the configuration elements of the communication control device 10 illustrated in FIG. 1 do not need to be physically configured like the drawings. That is, a specific embodiment of distribution/integration of devices is not limited to the one illustrated in the drawings, and a part or all of the devices can be functionally or physically configured in any unit according to various load, usage, or the like. For example, the traffic monitoring unit 11 and the number of ranks calculation unit 12 of the communication control device 10 or the number of ranks calculation unit 12 and the rank value calculation unit 15 may be integrated as a single configuration element. In contrast, the communication control unit 13 may be distributed to a part that compares the rank values R of the mobile stations at the determination timing and a part that selects the download destination mobile station based on a comparison result of the rank values R. Further, the HDD 10d may be connected through a network or a cable as an external device of the communication control device 10.

According to one aspect of a communication control device disclosed by the present application, use efficiency of radio resources can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A communication control device comprising:
   a monitoring unit that monitors a traffic amount between a server that downloads data to a plurality of mobile stations and a base station;
   a number calculation unit that calculates a number of steps of a value that serves as a reference for determining a mobile station of a download destination of the data based on a monitoring result by the monitoring unit;
   a value calculation unit that calculates the value for each mobile station using the number of steps calculated by the number calculation unit and radio communication quality of the plurality of mobile stations;
   a determination unit that determines the mobile station of a download destination in order from a mobile station in which the value at a first timing is higher, the value being calculated by the value calculation unit; and
   a control unit that downloads the data to the mobile station determined as the download destination by the determination unit, wherein
   the number calculation unit calculates a number of ranks according to a rate of traffic to be decreased and a threshold value based on a predetermined calculation formula, wherein
   the number calculation unit calculates threshold values that are boundary values of a plurality of the values for each mobile station using a maximum value and a minimum value of the radio communication quality of the plurality of mobile stations at a predetermined time and the number of steps and
   the value calculation unit calculates the value for each mobile station based on whether the radio communication quality of each mobile station is equal to or more than the threshold value calculated by the number calculation unit, wherein
   the maximum value is a maximum value of a Signal to Interference Ratio (SIR) of a corresponding mobile station in a past predetermined time and
   the minimum value is a minimum value of the Signal to Interference Ratio (SIR) of the corresponding mobile station in the past predetermined time.
2. The communication control device according to claim 1, wherein the determination unit determines a mobile station in which the value at the first timing is a predetermined value or more as the mobile station of a download destination.

3. A mobile station that performs communication with a communication control device, the mobile station comprising:
- a calculation unit that calculates a value using a number of steps of the value that serves as a reference for determining a mobile station of a download destination of data, the number of steps being calculated based on a monitoring result of a traffic amount between a server that downloads the data to a plurality of mobile stations and a base station, and radio communication quality of the mobile stations;
- a determination unit that determines appropriateness of execution of the download based on whether the value at a first timing calculated by the calculation unit is equal to or more than a predetermined value notified from the communication control device; and
- a reception unit that receives data to be downloaded from the communication control device when the download has been determined to be executable by the determination unit, wherein
- the communication control device includes a number calculation unit that calculates a number of ranks according to a rate of traffic to be decreased and a threshold value based on a predetermined calculation formula and
- a value calculation unit calculates the value for each mobile station using the number of steps calculated by the number calculation unit and the radio communication quality of the plurality of mobile stations, wherein
- the number calculation unit calculates threshold values that are boundary values of a plurality of the values for each mobile station using a maximum value and a minimum value of the radio communication quality of the plurality of mobile stations at a predetermined time and the number of steps and
- the value calculation unit calculates the value for each mobile station based on whether the radio communication quality of each mobile station is equal to or more than the threshold value calculated by the number calculation unit, wherein
- the maximum value is a maximum value of a Signal to Interference Ratio (SIR) of a corresponding mobile station in a past predetermined time and
- the minimum value is a minimum value of the Signal to Interference Ratio (SIR) of the corresponding mobile station in the past predetermined time.

4. A communication control method comprising:
- monitoring a traffic amount between a server that downloads data to a plurality of mobile stations and a base station;
- first calculating a number of steps of a value that serves as a reference for determining a mobile station of a download destination of the data based on a result of the monitoring;
- second calculating the value for each mobile station using the calculated number of steps and radio communication quality of the plurality of mobile stations;
- determining the mobile station of a download destination in order from a mobile station in which the value at a first timing is higher; and
- controlling download of the data to the mobile station determined as the download destination, wherein
- the first calculating includes calculating a number of ranks according to a rate of traffic to be decreased and a threshold value based on a predetermined calculation formula, wherein
- the first calculating includes calculating threshold values that are boundary values of a plurality of the values for each mobile station using a maximum value and a minimum value of the radio communication quality of the plurality of mobile stations at a predetermined time and the number of steps and
- the second calculating includes calculating the value for each mobile station based on whether the radio communication quality of each mobile station is equal to or more than the threshold value calculated at the first calculating, wherein
- the maximum value is a maximum value of a Signal to Interference Ratio (SIR) of a corresponding mobile station in a past predetermined time and
- the minimum value is a minimum value of the Signal to Interference Ratio (SIR) of the corresponding mobile station in the past predetermined time.

* * * * *